United States Patent
Matsumiya et al.

(10) Patent No.: US 10,022,628 B1
(45) Date of Patent: Jul. 17, 2018

(54) SYSTEM FOR FEATURE-BASED MOTION ADAPTATION

(71) Applicant: Electronic Arts Inc., Redwood City, CA (US)

(72) Inventors: Masatoshi Matsumiya, Port Moody (CA); Paolo Rigiroli, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 281 days.

(21) Appl. No.: 15/081,257

(22) Filed: Mar. 25, 2016

Related U.S. Application Data (60) Provisional application No. 62/141,154, filed on Mar. 31, 2015.

(51) Int. Cl.
*A63F 13/577* (2014.01)
*A63F 13/213* (2014.01)
*A63F 13/428* (2014.01)

(52) U.S. Cl.
CPC .......... *A63F 13/577* (2014.09); *A63F 13/213* (2014.09); *A63F 13/428* (2014.09)

(58) Field of Classification Search
CPC ..... A63F 13/577; A63F 13/213; A63F 13/428
See application file for complete search history.

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,961,060 B1 | 11/2005 | Mochizuki et al. |
| 7,403,202 B1 * | 7/2008 | Nash ........................ G06T 13/40 345/474 |
| 8,154,544 B1 * | 4/2012 | Cameron ................ G06T 19/20 345/419 |
| 8,281,281 B1 | 10/2012 | Smyrl et al. |
| 8,395,626 B2 | 3/2013 | Millman |
| 8,599,206 B2 | 12/2013 | Hodgins et al. |
| 8,860,732 B2 | 10/2014 | Popovic et al. |
| 9,741,146 B1 | 8/2017 | Nishimura |
| 9,990,754 | 6/2018 | Waterson et al. |
| 2002/0180739 A1 | 12/2002 | Reynolds et al. |
| 2004/0227760 A1 * | 11/2004 | Anderson ............... G06T 13/40 345/473 |
| 2004/0227761 A1 * | 11/2004 | Anderson ............... G06T 13/40 345/473 |

(Continued)

OTHER PUBLICATIONS

Belytschko et al., "Assumed strain stabilization of the eight node hexahedral element," Computer Methods in Applied Mechanics and Engineering, vol. 105(2), pp. 225-260 (1993), 36 pages.

(Continued)

*Primary Examiner* — Corbett B Coburn
(74) *Attorney, Agent, or Firm* — Knobbe, Martens, Olson & Bear, LLP (57) ABSTRACT

Embodiments of the systems and processes disclosed herein can use procedural techniques to calculate reactionary forces between character models. In some embodiments, the system can calculate a change in momentum of the character at the time of impact and simulate the reaction of the character model, using momentum-based inverse kinematic analysis. Procedural animation can be used to dynamically generate a target pose for the character model based on the inverse kinematic analysis for each rendered frame.

20 Claims, 6 Drawing Sheets

(56) References Cited

U.S. PATENT DOCUMENTS

| | | | |
|---|---|---|---|
| 2006/0149516 | A1 | 7/2006 | Bond et al. |
| 2006/0262114 | A1* | 11/2006 | Leprevost ............... G06T 13/20 |
| | | | 345/419 |
| 2007/0085851 | A1 | 4/2007 | Muller et al. |
| 2007/0097125 | A1* | 5/2007 | Xie ......................... G06T 13/40 |
| | | | 345/473 |
| 2008/0049015 | A1 | 2/2008 | Elmieh et al. |
| 2008/0152218 | A1* | 6/2008 | Okada ................ G06K 9/00369 |
| | | | 382/159 |
| 2008/0316202 | A1 | 12/2008 | Zhou et al. |
| 2009/0066700 | A1 | 3/2009 | Harding et al. |
| 2009/0315839 | A1* | 12/2009 | Wilson ................ G06F 17/5009 |
| | | | 345/173 |
| 2010/0134501 | A1 | 6/2010 | Lowe et al. |
| 2010/0251185 | A1 | 9/2010 | Pattenden |
| 2011/0012903 | A1 | 1/2011 | Girard |
| 2011/0119332 | A1 | 5/2011 | Marshall et al. |
| 2011/0128292 | A1* | 6/2011 | Ghyme ................... G06T 13/40 |
| | | | 345/474 |
| 2011/0292055 | A1 | 12/2011 | Hodgins et al. |
| 2012/0303343 | A1 | 11/2012 | Sugiyama et al. |
| 2012/0313931 | A1 | 12/2012 | Matsuike et al. |
| 2013/0120439 | A1 | 5/2013 | Harris et al. |
| 2013/0121618 | A1 | 5/2013 | Yadav |
| 2013/0222433 | A1* | 8/2013 | Chapman ................ G06T 13/40 |
| | | | 345/660 |
| 2013/0235045 | A1* | 9/2013 | Corazza .................. G06T 13/40 |
| | | | 345/473 |
| 2013/0263027 | A1 | 10/2013 | Petschnigg et al. |
| 2014/0002463 | A1 | 1/2014 | Kautzman et al. |
| 2014/0198106 | A1* | 7/2014 | Sumner ................... G06T 13/40 |
| | | | 345/473 |
| 2014/0198107 | A1* | 7/2014 | Thomaszewski ....... G06T 13/40 |
| | | | 345/473 |
| 2015/0113370 | A1 | 4/2015 | Flider |
| 2015/0187113 | A1 | 7/2015 | Rubin et al. |
| 2015/0243326 | A1 | 8/2015 | Pacurariu et al. |
| 2016/0026926 | A1 | 1/2016 | Yeung et al. |
| 2016/0314617 | A1 | 10/2016 | Forster et al. |
| 2016/0354693 | A1 | 12/2016 | Yan et al. |
| 2018/0043257 | A1 | 2/2018 | Stevens |

OTHER PUBLICATIONS

Belytschko et al., Nonlinear Finite Elements for Continua and Structures, Second Edition, Wiley (Jan. 2014), 727 pages (uploaded in 3 parts).

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Georgii et al., "Corotated Finite Elements Made Fast and Stable", Workshop in Virtual Reality Interaction and Physical Simulation VRIPHYS (2008), 9 pgs.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Macklin et al., "Position Based Fluids", to appear in ACM TOG 32(4), 2013, 5 pgs.

Mcadams et al., "Efficient Elasticity for Character Skinning with Contact and Collisions", 2011, 11 pgs.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs.

Parker et al., "Real-Time Deformation and Fracture in a Game Environment", Eurographics/ACM SIGGRAPH Symposium on Computer Animation (2009), 12 pgs.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGRAPH Symposium on Computer Animation (2012), 9 pgs.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Geijtenbeek, T. et al., "Interactive Character Animation using Simulated Physics", Games and Virtual Worlds, Utrecht University, The Netherlands, The Eurographics Association 2011, 23 pgs.

Han et al., "On-line Real-time Physics-based Predictive Motion Control with Balance Recovery," Eurographics, vol. 33(2), 2014, 10 pages.

Komura et al., "Animating reactive motion using momentum-based inverse kinematics," Computer Animation and Virtual Worlds, vol. 16, pp. 213-223, 2005, 11 pages.

Nguyen et al., "Adaptive Dynamics With Hybrid Response," 2012, 4 pages.

Orin et al., "Centroidal dynamics of a humanoid robot," Auton Robot, vol. 35, pp. 161-176, 2013, 18 pages.

Treuille, A. et al., "Near-optimal Character Animation with Continuous Control", University of Washington, 2007, 7 pgs.

Wu et al., "Goal-Directed Stepping with Momentum Control," Eurographics/ ACM SIGGRAPH Symposium on Computer Animation, 2010, 6 pages.

Andersson, S., Goransson, J.: Virtual Texturing with WebGL. Master's thesis, Chalmers University of Technology, Gothenburg, Sweden (2012).

Dudash, Bryan. "Skinned instancing." NVidia white paper(2007).

Fikkan, Eirik. Incremental loading of terrain textures. MS thesis. lnstitutt for datateknikk og informasjonsvitenskap, 2013.

Hernandez, Benjamin, et al. "Simulating and visualizing real-time crowds on GPU clusters." Computaci6n y Sistemas 18.4 (2014): 651-664.

Klein, Joseph. Rendering Textures Up Close in a 3D Environment Using Adaptive Micro-Texturing. Diss. Mills College, 2012.

Lee, Y. et al., "Motion Fields for Interactive Character Animation", University of Washington, Bungie, Adobe Systems, 8 pgs, obtained Mar. 20, 2015.

(56) References Cited

OTHER PUBLICATIONS

Levine, S. et al., "Continuous Character Control with Low-Dimensional Embeddings", Stanford University, University of Washington, 10 pgs, obtained Mar. 20, 2015.
McDonnell, Rachel, et al. "Clone attack! perception of crowd variety." ACM Transactions on Graphics (TOG). vol. 27. No. 3. ACM, 2008.
Musse, Soraia Raupp, and Daniel Thalmann. "Hierarchical model for real time simulation of virtual human crowds." IEEE Transactions on Visualization and Computer Graphics 7.2 (2001): 152-164.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Ruiz, Sergio, et al. "Reducing memory requirements for diverse animated crowds." Proceedings of Motion on Games. ACM, 2013.
Seo et al., "Compression and Direct Manipulation of Complex Blendshape Models", Dec. 2011, in 10 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Ulicny, Branislav, and Daniel Thalmann. "Crowd simulation for interactive virtual environments and VR training systems." Computer Animation and Simulation 2001 (2001): 163-170.
Vigueras, Guillermo, et al. "A distributed visualization system for crowd simulations." Integrated Computer-Aided Engineering 18.4 (2011): 349-363.

\* cited by examiner

SYSTEM FOR FEATURE-BASED MOTION ADAPTATION

INCORPORATION BY REFERENCE TO ANY PRIORITY APPLICATIONS

This application claims priority to U.S. Provisional Application No. 62/141,154, filed on Mar. 31, 2015 and titled "SYSTEM FOR FEATURE-BASED MOTION ADAPTATION," which is hereby incorporated herein by reference in its entirety for all purposes.

BACKGROUND

Demand for ever increasing realism and detail in computer-implemented video games seems to drive the growth of computer performance. Unlike computer animation and movie rendering which can process individual scenes over time for playback at a higher frame rate, computer-implemented video games and computer-implemented simulators must render complete, three-dimensional (3D) scenes of a virtual game environment during runtime of the game application, typically at a rate of thirty (30) frames per second or better. It can be difficult to produce animations that appear lifelike, fluid, and realistic when rendering during runtime of the game application.

SUMMARY OF EMBODIMENTS

The systems, methods, and devices of this disclosure each have several innovative aspects, no single one of which is solely responsible for the all of the desirable attributes disclosed herein.

One embodiment discloses a system comprising: a data store comprising game application data; a motion, capture data store comprising motion capture data; and a computing device in electronic communication with the data store and configured to execute a game application based in part on the game application data, the game application configured to: generate a virtual game environment; determine a first pose of a first virtual character model within the virtual game environment, the first virtual character model comprising a plurality of a rigid bodies connected by a plurality of joints, wherein the first pose is a first arrangement of the rigid bodies and joints of the first virtual character model; detect a collision event of the first virtual character model with a virtual entity within the game environment; calculate at least one target feature of the first virtual character model based at least in part on the collision event; identify motion capture data in the motion capture data store based at least in part on the collision event and the at least one target feature of the first virtual character, wherein the motion capture data corresponds to a second, arrangement of the first virtual character model; modify the motion capture data received from the motion capture data store based, at least in part, on the at least one target feature to generate an updated pose of the first virtual character model, wherein updated pose is a third arrangement of the first virtual character model; render the first virtual character model based, at least in part on the updated pose of the first virtual character model; and generate instructions to output a frame comprising at least a portion of the updated pose of the first virtual character model rendered by a rendering engine of the game application for a user display.

Another embodiment discloses a computer-implemented method comprising: as implemented by a user computing device configured with specific computer-executable instructions for executing a game application, generating a virtual environment; determining first pose of a first virtual character model within the virtual game environment, the first virtual character model comprising a plurality of a rigid bodies connected by a plurality of joints; wherein the first pose is a first arrangement of the rigid bodies and joints of the first virtual character model; detecting a collision event of the first virtual character model with a virtual entity within the game environment; calculating at least one target feature of the first virtual character model based, at least in part, on the collision event; identifying motion capture data in a motion capture data store based at least in part on the collision event and the at least one target feature of the first virtual character, wherein the motion capture data corresponds to a second arrangement of the first virtual character model; modifying the motion capture data received from the motion capture data store based, at least in part, on the at least one target feature to generate an updated pose of the first virtual character model, wherein updated pose is a third arrangement of the first virtual character model; rendering the first virtual character model based, at least in part on the updated pose of the first virtual character model; and generating instructions to output a frame comprising at least a portion of the updated pose of the first virtual character model rendered by a rendering engine of the game application for a user display.

Another embodiment discloses a non-transitory computer-readable storage medium having stored, thereon instructions that, when executed, direct a computing system to perform a method for rendering frames within, a game application, the method comprising: generating a virtual environment; determining a first pose of a first virtual character model within the virtual game environment, the first virtual character model comprising a plurality of a rigid bodies connected by a plurality of joints; wherein the first pose is a first arrangement of the rigid bodies and joints of the first virtual character model; detecting a collision event of the first virtual character model with a virtual entity within the game environment; calculating at least one target feature of the first virtual character model based at least in part on the collision event; identifying motion capture data in a motion capture data store based at least in part on the collision event and the at least one target feature of the first virtual, character, wherein the motion capture data corresponds to a second arrangement of the first virtual character model; modifying the motion capture data received from the motion capture data store based, at least in part, on the at least one target feature to generate an updated pose of the first virtual character model, wherein updated pose is a third arrangement of the first virtual character model; rendering the first virtual character model based, at least in part on the updated pose of the first virtual character model; and generate instructions to output a rendering of the updated pose of the first virtual character model.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF EMBODIMENTS

Overview

A video game application can use defined sequences of animations when rendering frames of the game application. The animations can be used to show actions of a character or other entities within a game environment. For example, when an event within the game environment results in contact between two characters, an animation may be presented to the user that illustrates the interaction between the characters. As another example, when a user pushes another player within the game, the game may present an animation of the user pushing the second character. In some game applications, at least some of the animations may be created using motion capture technology. By using motion capture technology, more lifelike animations can be created compared to other animation techniques.

Some game applications may use a large number of motion capture-based animations. For example, some game applications may have hundreds or even thousands of animations. Some applications may require a large amount of non-volatile storage space to be allocated for the animations included in the applications. The motion capture-based animations may be context-specific animations. For example, some game applications may have an animation depicting a type of collision between characters. For example, in a soccer game when a player impacts another player, such as stealing the ball or pushing against another player. There may be thousands of animations devoted specifically to the illustration of interactions between characters. Creating the vast number of animations can be time consuming and, may use a relatively large amount of non-volatile storage space. In some cases, the pre-generated animations may be referred to as "canned" animations. However, it would be difficult to capture and generate motion capture animations for every type of interaction a character may encounter within a game environment.

One problem associated with the motion capture animations is that the contact may not simulate a reactionary force from the character being contacted. For example, the game engine of the game application may select an animation based on the calculated impact force of the physical models within the game environment. Based on a variety of factors, the game engine can select an animation to simulate the outcome of the event. However, this generally does not calculate reactionary forces associated with collisions between character models. The animations may simulate an interaction between the colliding character models, without actually calculating the reactionary forces between the character models. This may result animations that do not take into account various attributes of a character model such as strength or size.

One solution is for the game engine to determine the active response of the character model when a force is applied by another character model. The game application can determine how the character model would respond to a collision. For example, the character model can absorb the impact of the collision and afterwards actively pushing back to counter the force being applied by the pushing model. The character model can dynamically respond to the collision forces as opposed to implementing a "canned" animation sequence. By actively responding to the opposing force, the two opposing character models can establish poses that are a dynamic equilibrium of opposing forces and appear more lifelike and realistic.

Embodiments of the systems and processes disclosed herein can use procedural techniques to calculate reactionary forces between character models. In some embodiments, the system can calculate a change in momentum of the character at the time of impact and simulate the reaction of the character model using momentum-based inverse kinematic analysis. The game can search for motion capture data based on the forces applied to the target pose of the character model. The selected motion capture data can be modified based on the target pose. The system can edit the momentum and the trajectory of the center of mass for the motion capture data to better match the calculated forces of the target pose. The system can update the pose of the character model and provide the updated character model for rendering.

In some embodiments, the game engine can continue to analyze the forces applied to the character model and update the character model accordingly at each frame. Generally, during a collision, the character model will transition from receiving a force to absorbing the impact of the applied force, and providing a reactionary force in opposition to the applied force. The game can continue to calculate the forces being applied to the character models until the collision ends or another stop event occurs.

Although this disclosure focuses on videogames, it should be understood that embodiments described herein can be used with other types of software applications. For example, an educational application, a cartoon, a training application, a simulator, or a help guide within an application may each use one or more embodiments of the present disclosure. Characters can represent people, animals, creatures, cars, or the entities within the game environment.

Overview of Game System Embodiments

Figure 1:
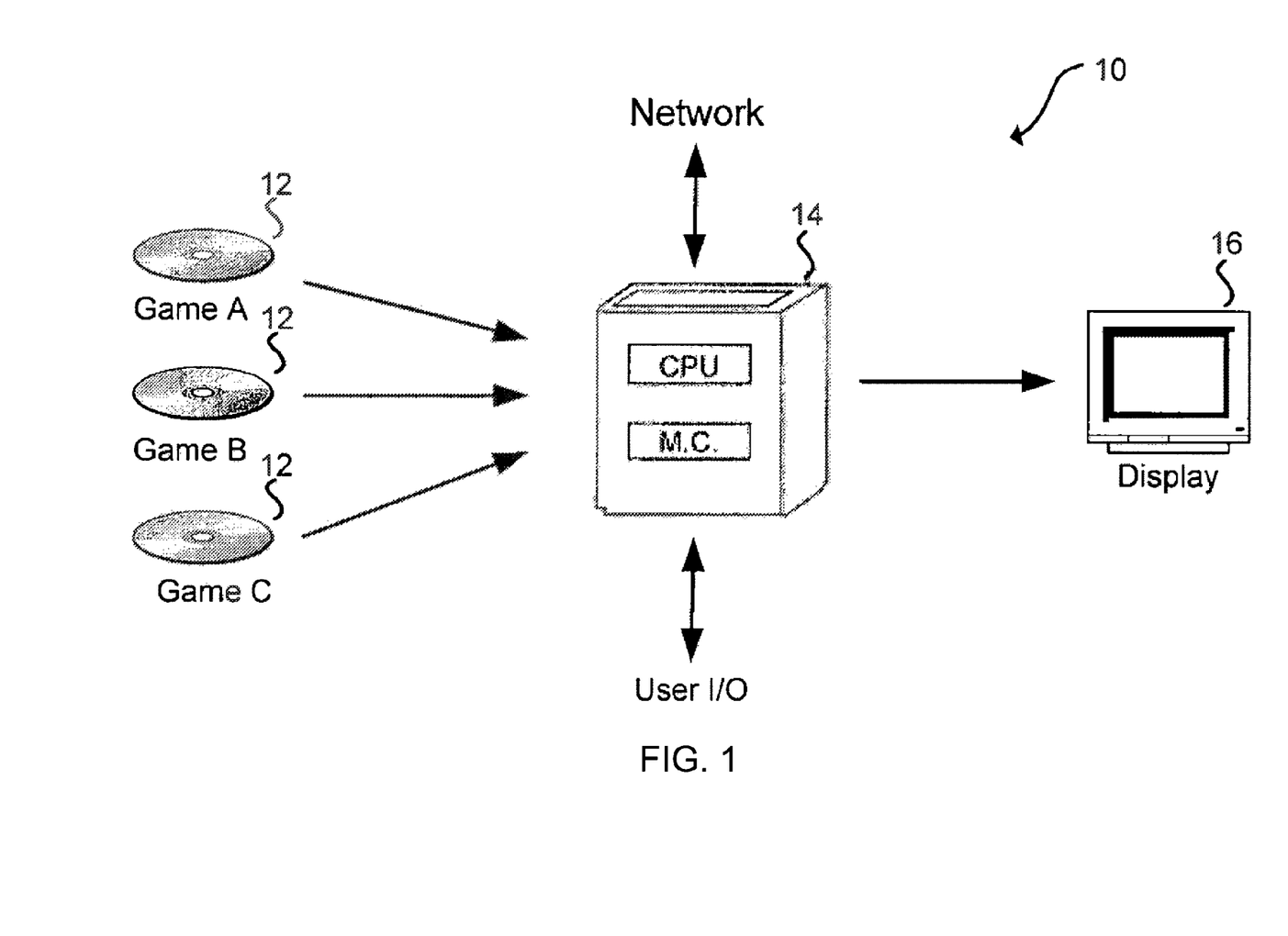
FIG. 1 illustrates an embodiment of a game system.

FIG. 1 illustrates a game system 10 for providing one or more games to a user according to embodiments of the present disclosure. The system 10 includes one or more game media 12 (game A, game B, game C), a computing device 14, and a display 16.

The game media 12 may include one or more game applications that may be used or executed by the game device 14 to involve a user in a game. The game medium 12 can store logic for execution of a game by the system 10. In one embodiment, the game application provided for execution by the game device 14 is an electronic video game. Games can be individually stored on physical media, such as compact disk read-only memories (CD-ROMs), digital versatile disks (DVDs), game cartridges, flash drives, or other storage media. A game, such as game A, can be inserted in, coupled to, or in communication with the game device 14 so that the game device 14 can read all or part of a game application and/or related game data stored on game media 12. In some instances, game applications can be at least partially stored on the game device 14, or accessible from another computing system, such as over a network.

The game device 14 is a computing device that includes one or more processors, such as central processing units (CPUs), graphics processing units (GPUs), and data storage combined or in separate elements. In some embodiments, the game device 14 can be a specialized computing device created for the purpose of executing game applications. The games executed by the game device 14 may be created using a particular application programming interface (API) or compiled into a particular instruction set that may be specific to the game device 14. In other cases, the game device 14 may be a general purpose computing device capable of executing game applications and non-game applications. For example, the game device 14 may be a laptop, a tablet, or a desktop computer. The game device 14 may also be connected to a network (such as, but not limited to, the Internet) and game device 14 may access games that are not included on game media 12 by, for example, accessing another computing system over the network. In some such embodiments, game A, game B, and/or game C may be accessed through the network, in whole or in part, and may not be individually stored on game media 12. To allow a user to select from a plurality of available games available on game media 12 or via the network, a display 16 might present a list of the games provided by game applications on game media 12.

A game application may also be referred to as a game code and/or a game program. A game application should be understood to include software code that a game device 14 can use to provide a game for a user to play. A game application might comprise software code that informs a game device 14 of processor instructions to execute, but might also include data used in the playing of the game, such as data relating to constants, images and other data structures created by the game developer including prerecorded animation data. A user may interact with the game application and game device 14 through user input/output (I/O) devices.

Figure 2:
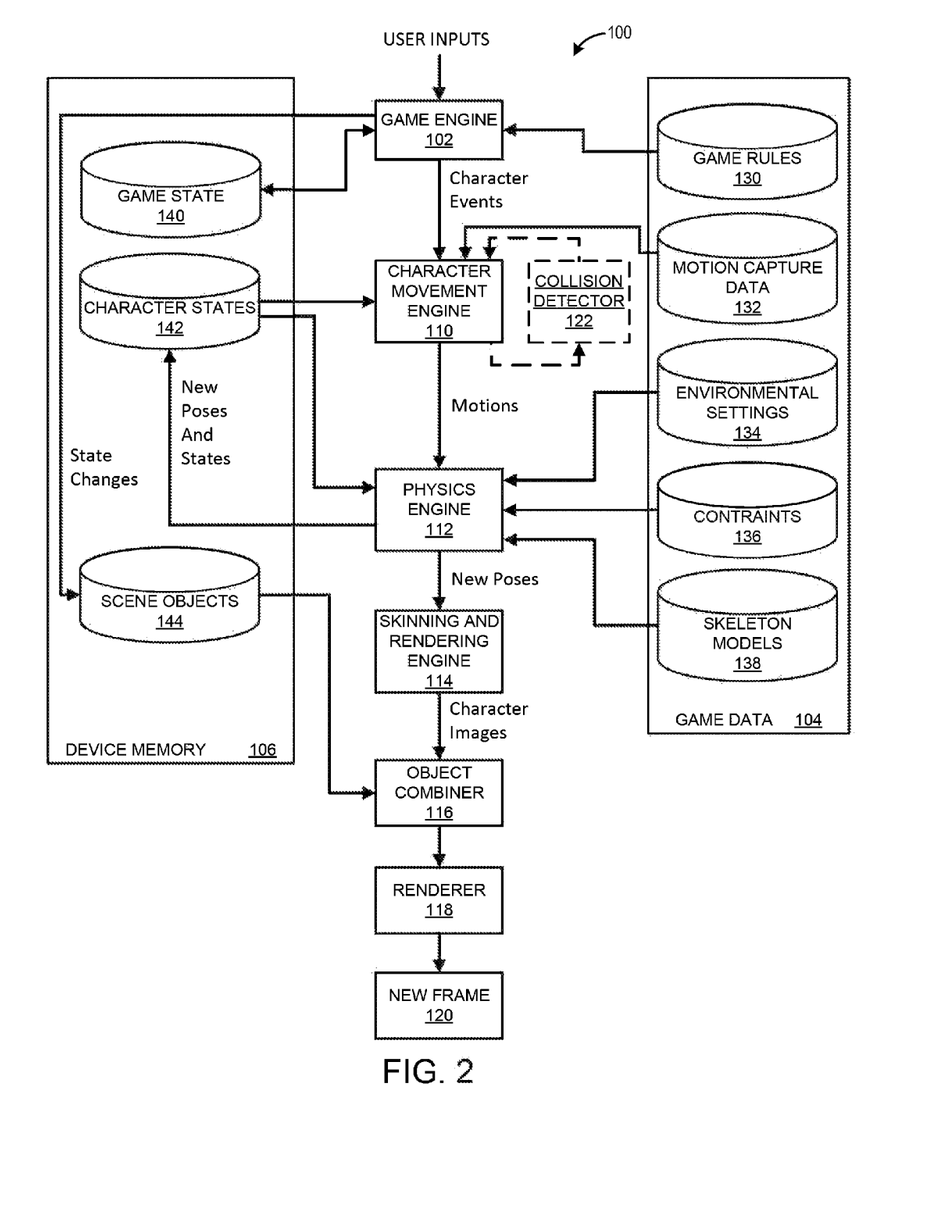
FIG. 2 illustrates an embodiment of elements of a game system.

FIG. 2 illustrates an embodiment of components of a game application system 100 for generating, rendering, and outputting frames for display during operation of the game application. The game application system 100 receives user inputs and generates commands configured to output video and audio data. The game system 14 and/or display can provide the corresponding video and audio output to the user. During operation of a game application, the output video data is generated as a series of frames. Preferably, the game application is capable of generating frames at a rate that does not diminish the gameplay experience for the user (for example, at least 30 frames per second).

In one embodiment, a game engine 102 receives the user inputs and determines character events, such as actions, collisions, runs, throws, attacks and other events appropriate for the game. The character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths from a motion capture data repository 132 as well as character states 142. The motion capture data repository 132 can store motion capture video and/or motion capture images that may be used to generate procedural animation. A collision detector engine 122 can perform a process that can derive the desired motions for characters based on collisions. Motions might be expressed as a set of external forces, target poses and the like.

Figure 3:
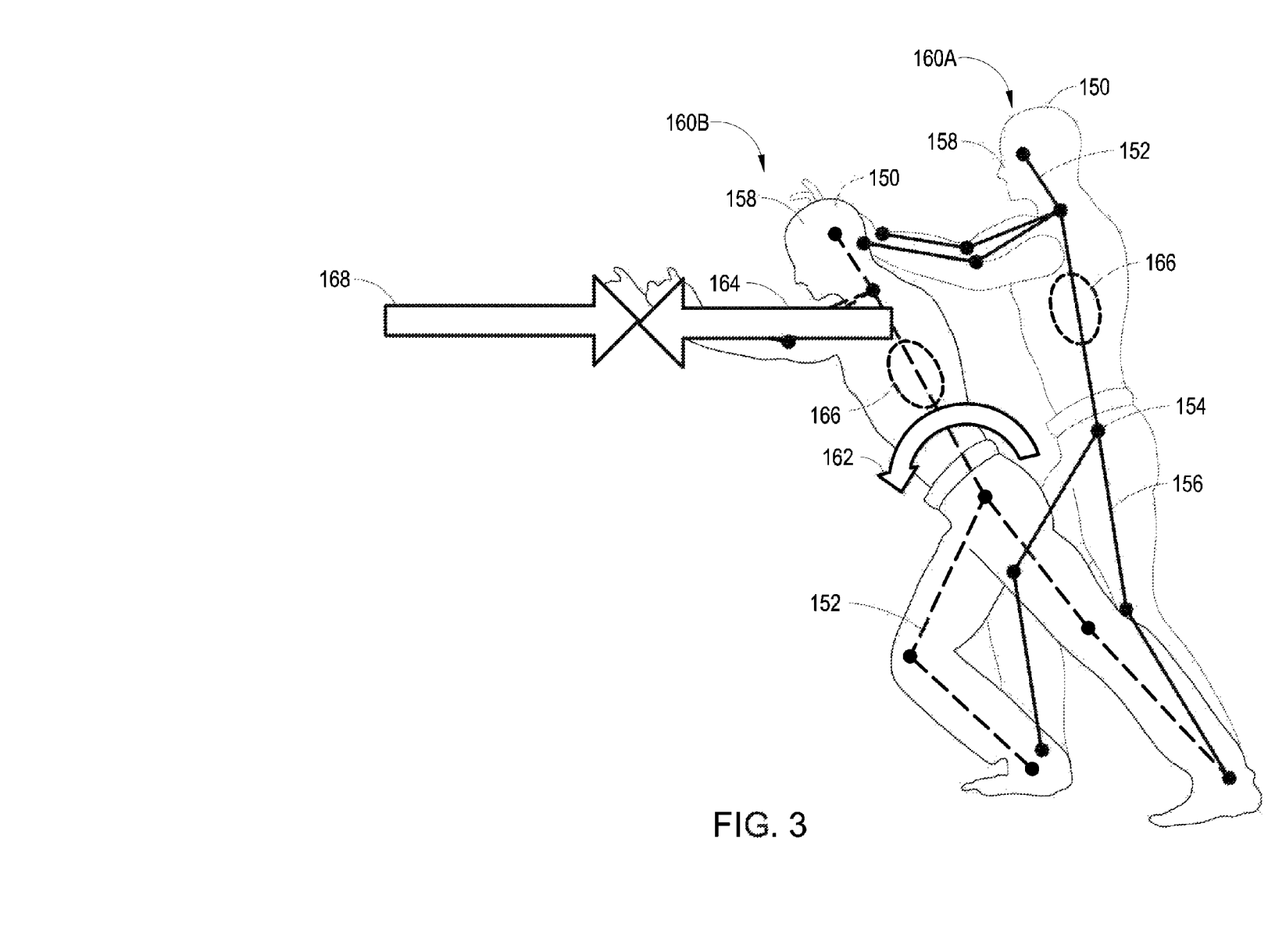
FIG. 3 illustrates an embodiment of aspects of character models for use in feature-based, motion adaptation process.
Figure 4:
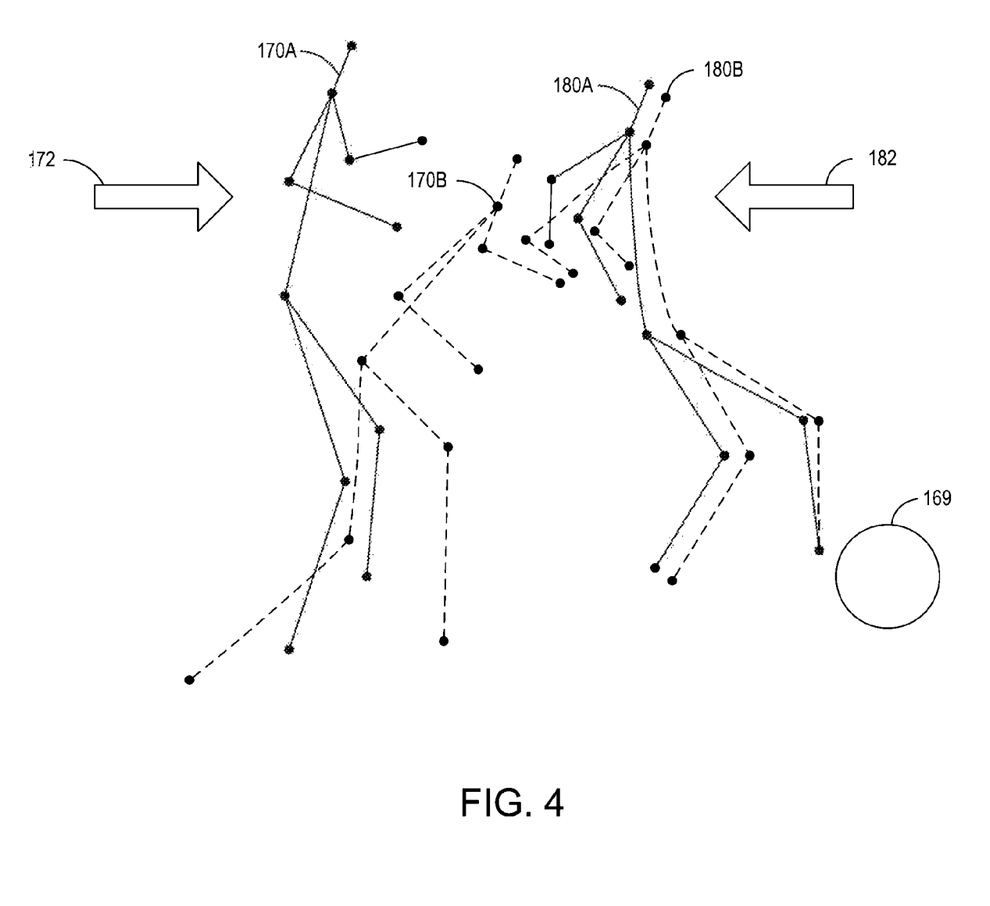
FIG. 4 illustrates an example embodiment illustrating aspects of character models in a feature-based motion adaptation process.

As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth. FIGS. 3 and 4 provide example embodiments of simplified skeletal models for purposes of illustrating the concepts and processes disclosed herein.

The exemplary physics engine 112 has as its inputs the skeleton models of various characters, environmental settings 134, character states such as current poses (for example, positions of body parts expressed as positions, joint angles or other specifications), and velocities (linear and/or angular) of body parts and motions provided by character movement engine 110, which can be in the form of a set of force/torque vectors for some or all body parts. From this information, physics engine 112 generates new poses for the characters using rules of physics, and those, new poses can be used to update character states 142 and are also provided to rendering engine 114. Where invisible skeleton models are used, character states 142 might contain current position of visible "graphics" of characters as well as the invisible rag-doll skeleton characters.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

In some embodiments, the character movement engine 110 can work, in conjunction with the physics engine 112 to create a procedural animation. In some such embodiments, the physics engine 112 may generate a target pose for an object or character in response to, for example, a collision detected by the collision detector 122. The target pose may be generated on a frame-by-frame basis and can be based at least in part on one or more physics rules implemented by the physics engine 112. For example, the target pose may be based at least in part on a current pose of the character and the impact of a collision force and a gravitational value. The character movement engine 110 can use the target pose to identify a motion capture data included in the motion capture data repository 132. The identified motion capture data may not be an exact match to the calculated target pose. The motion capture data can be modified based on the target pose to generate an updated pose for the character model. The updated pose can be provided to the skinning and rendering engine 114 for rendering of the character model within the game environment. The updated target pose may be used for a subsequent frame, and the process of selecting motion capture animation may be repeated.

Advantageously, in certain embodiments, using the target pose to select a motion capture animation and updating the pose of the model based on the motion capture animation enables more fluid procedural animation compared to pre-existing processes. Further, the use of procedural animation can result in a larger variety of animation within a game while reducing storage space for the game data 104 of a game. In certain embodiments, one or more of the game engine 102, the character movement engine 110, the physics engine 112, and the collision detector 122, among other systems may be configured to execute the processes discussed below with respect to FIGS. 3, 4, and 5.

Character Model Embodiments

FIG. 3 illustrates an embodiment of positions of a character model 150. The character model 150 can be movable and is illustrated in a first position 160A and a second position 160B. The character model 150 can include a mesh 158 and a skeleton frame 152, which includes a plurality of elements, such as joints 154 and rigid bodies 156. The character model 150 can be referred to as a rig. The illustrated character model 150 has been simplified for clarity. A character model 150 for use within a game application may include any number of joints, members, meshes, and data that can be used to represent a character or entity within a game environment. The physics engine can determine forces associated with the movement of the character model 150. For example, the physics engine can determine a center of mass 166, a linear momentum 164, and an angular momentum associated with the character model 150. A center of mass 166 can be for the entire character model. The linear momentum and the angular momentum can be calculated for the center of mass, for each joint, or rigid body of the character model. The linear momentum can also be referred to as the pushing force, which can refer to internal forces. The arrow 168 can be referred to as the pushed force or the collision force, which can refer to external forces. The collision for is representative of another character model or entity with in the game environment that is colliding with the character model 150. A "feature" can refer to characteristics of the character model, such the center of mass, position, orientation, linear momentum, angular momentum, velocity and the like. The features can apply to individual elements of the model (such as, individual joints or rigid bodies), groupings of elements (such as, the torso, which may include a plurality of joints and rigid bodies), the pose (such as, pose orientation), and the like. Some examples of a feature may include: position of the foot, linear and angular momentum of the head, whole-body orientation, velocity of a joint, and the like.

The first position 160A represents the collision pose of the character model 150 based on motion-capture data. The second position 160B represents a calculated pose of the character model 150 based on an analysis of the collision forces on the model using momentum-based full body inverse kinematics. The second position can be referred to as the rigid body approximation that is calculated by the physics engine. The physics engine can use momentum-based full body inverse kinematics to modify the motion capture based-pose of the character model to more accurately represent the forces experienced by the character model within the game environment. In some embodiments, the use of momentum-based full body inverse kinematics can enable direct modification of a motion capture data, including: 1) feet position/orientation or linear/angular velocity; and 2) center of mass's position/orientation, linear/ angular velocity or linear/angular momentum. The momentum-based full body inverse kinematics may be used to calculate the linear velocity and angular velocity of each joint of the character model in order to 1) determine target end-effector's linear/angular velocity; 2) determine target linear/angular momentum around center of mass; and 3) determine the nearest reference angular velocity from the motion-based animation. In some embodiments, the inverse kinematic analysis can compute a Jacobian matrix that correlates the time derivative of generalized coordinates with the linear momentum and angular momentum in addition to ordinary Jacobian matrix responsible for the position and orientation of the end-effector. After which, in some embodiments, it can compute joint's angular velocity from the Jacobian matrix by using the damped least squares methods.

In some embodiments, the system can use a procedural method. In such an embodiment, a supervisory routine can automatically choose when and where to position elements of the character model, such as the foot in, order to remove linear and angular momentum induced by a collision. The calculated position and duration can guide desired changes of features of the character model, such as a character's center of mass, the position of the swing foot over the movement of the other foot, and other features. The desired time-varying values for the center of mass and other features can be derived from parametric curve generators. The final full-body motion can be generated by momentum based full body inverse kinematics using the calculated trajectories and momentum as constraints.

In some embodiments, a dynamics model with trajectory optimization can be used. In such embodiments, the game engine can use a physics-based approach to motion control with contact foot repositioning based on a low-dimensional dynamics model using example motion data. Although the dynamics for human locomotive motions is complex, it can be abstracted with simple dynamics consistent with the original one from the viewpoint of the total momentum of a full body at the center of mass regardless of the body structure. Guided by the reference motion, it can repeatedly generate a control policy (for example, linear force applied to foot, ground reaction force, and position of center of pressure) for a small time window that spans a couple of footsteps in the reference motion through model predictive control. In some embodiments, the final full-body motion can be generated by momentum-based full body inverse kinematics using the calculated trajectories of the feet and momentum as constraints.

The game engine can modify the motion capture data to satisfy new dynamic constraints calculated for the character model illustrated in the second position 160B. For example, in some embodiments, the game engine can use momentum-based full body inverse kinematics for balancing and momentum preserved transitioning, based on direct manipulation of high-level features of movement, such as center-of-mass, angular momentum, and end-effectors. This approach can include computing physically valid transitions between several frames in order to react to collisions. The approach can simulate an immediate reaction, depending on the intensity of the collision, before interpolating towards a response motion based on the stored motion capture data. When a collision force is applied to the character, it can be transformed to an increase in the linear momentum and angular momentum around the center of mass. At the same time, a counteracting motion can be blended into the primary motion. The counteracting motion can be determined that would be necessary for a character model to regain balance after receiving the collision force. The game engine can identify a motion capture data pose that would return the character model to a stable neutral pose based on characteristics of the pose. Some exemplary characteristics may include the momentum, the moment of inertia of the whole body, and the status of the feet of the current pose, and other characteristics of the pose. Since it may not be possible to pre-capture all potential reactive motions, the selected motion capture pose data can be edited using a momentum-based full body inverse kinematics method. Both the momentum and positions of elements of the character model, such, as footsteps, can be adjusted to deal with impacts of various strengths. The final full-body motion can be generated by momentum-based full body inverse kinematics using the calculated features of the character model, such as the foot position and momentum, as constraints.

Centroidal dynamics can be used to simulate interaction between characters within the game. Centroidal dynamics refers to dynamics of a humanoid projected at its center of mass. In some embodiments, the resultant effect of the all the external interaction forces is a force and a moment, or equivalently, the linear and angular momentum rate changes at the center of mass. In some embodiments, an animation's ground reaction force can be calculated approximately as force and torque at the center of mass by force based on a proportional-derivative controller between the animation's center of mass position and the current force, and between the animation's rotational analog of the center of mass position and the current force. In some embodiments, a whole-body response generator computes a reaction through this rigid body approximation of the character model. This model can influence the character's center of mass and global orientation to produce a physically based whole-body response to an interaction by using momentum-based full body inverse kinematics.

The game engine can enable a character to show active behavior such as pushing an opponent or being pushed while taking a step out for maintaining balance and push back against the opposing character model. In some embodiments, a whole-body movement can be computed through the rigid body approximation of the character. This model can influence the character's center of mass and global orientation to produce a physically based whole-body movement to an interaction, including an immediate reaction to a collision. When there is some difference between momentum, which current animation can handle, and momentum caused by an internal (pushing)/external (pushed) force applied to the character, a reacting animation can be searched in a database to be blended into the current animation. The search for the animation can focus on a change of momentum that this animation has. Since it is usually not possible to pre-capture all potential animation, the selected animation can be edited using a momentum-based full body inverse kinematics method. For example, both the momentum and the footsteps can be adjusted to deal with force of various strengths. In some embodiments, the full-body animation can be generated by momentum-based full body inverse kinematics using the calculated trajectories of the feet and momentum as constraints.

FIG. 4 illustrates an example embodiment of a collision between two character models within a game environment. The first character model illustrated in two positions 170A and 170B at the time of impact and in the direction illustrated by the arrow 172. The first character model illustrated in two positions 180A and 180B at the time of impact and in the direction illustrated by the force arrow 182. The environmental object 169 illustrates an object within the game environment, such as a soccer ball. The first position, of the first and second character models (solid lines) 170A and 180A, respectively, is representative the motion capture data that was identified based on the collision. The second position of the first and second character models (dashed lines) 170B and 180B, respectively, illustrates an updated position of the character model, which can be based, in part, on an analysis using momentum-based full body inverse kinematics. The second position can match the state of a rigid body approximation of the character model. As illustrated, the first character model is generally leaning to the right more and the second character model is shifted to the right. The different positions compensate for the forces that would be present within the game environment at this point in time. Changes to constraints and variables associated with the character models and/or environment may change the rigid body approximations and/or the motion capture based poses. For example, if one of the characters had a higher strength value associated, with the character within the game application, the position of the rigid body approximations may be shifted to the right or left. The emotion capture data can be modified to substantially match the rigid body approximations in order to determine an updated, pose for rendering within the game environment.

Example Feature-Based Motion Adaptation Process

Figure 5:
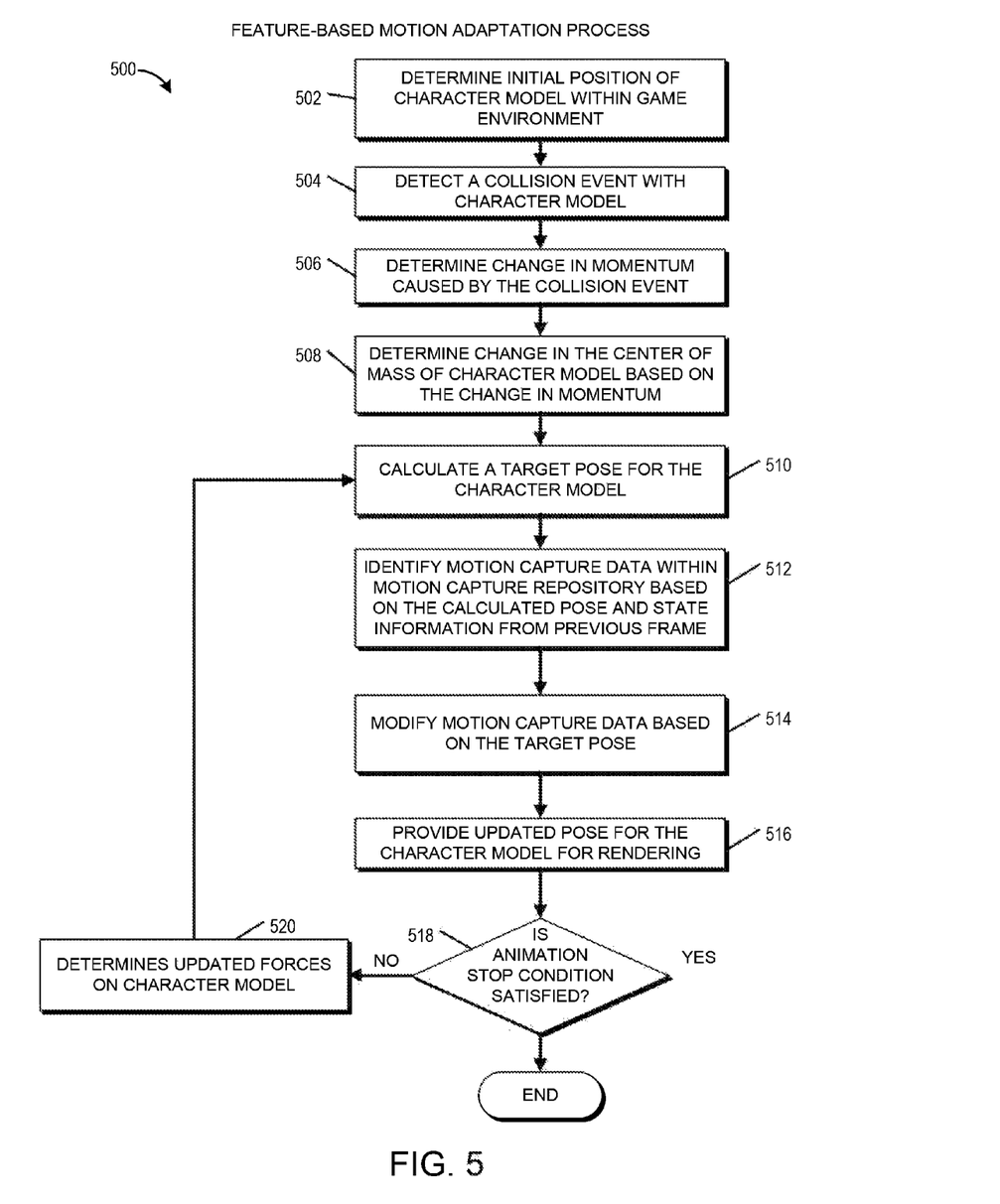
FIG. 5 presents a flowchart of an embodiment of a feature-based motion adaptation process.

FIG. 5 presents a flowchart of an embodiment of a sample-based motion synthesis process 500 relating to a collision event. The process 500 can be implemented by any system that can generate animation based on a reactive force based analysis to generate motion captured images in response to a collision event. For example, the process 500, in whole or in part, can be implemented by a game engine 102, a character movement engine 110, a collision detector 122, a physics engine 112, or a motion capture data repository 132, among others. Although any number of systems, in whole or in part, can implement the process 500, to simplify discussion, the process 500 will be described with respect to the game engine 102. Further, although embodiments of the process 500 may be performed with respect to any type of movable game object, to simplify discussion, the process 500 will be described with respect to a character within the game application. This character may be a user controlled character or a non-player character (NPC).

At block 502, the game engine 102 determines an initial position of a movable character. In some cases, the game engine 102 may use the character movement engine 110 to determine the initial position of the movable character. Determining the initial position of the movable character can include determining a position of a number of joints of the character or a position of number of joints of a skeleton of the character. Further, determining the initial position of movable character can include determining a rotation of the joints of the character, such as a quaternion rotation.

At block 504, the game engine 102 detects a collision event between character models. In some cases, the game engine 102 may use a collision detector 122 to detect the collision event. The collision event between characters can apply to any type of in-game action that is associated with triggering an analysis and associated animation of the collision event. For example, the trigger may include characters colliding, a character pushing another character, a character colliding with an object, or other type of collision event. The game engine 102 generates a dynamic procedural animation associated with the collision event, which may include any type of scene associated with the collision event. For example, the animation scene may be associated with a character being tackled, wrestling or pushing another character, cars colliding, a rock falling on a horse, or other type of collision event.

At block 506, the physics engine 112 can measure the change in momentum caused by the collision event. The game engine can use a character model representation of each character object. The character model may be formed from one or more rigid bodies. The rigid bodies may include or may form a skeleton model of the character. The forces applied by the rigid bodies can be used to calculate differences between momentums of the character models. The game engine 102 can identify a character model that is applying the force in the collision and identify the character that is receiving the force. The character applying the force is generally referred to as the pushing character and the character receiving the force is generally referred to as the pushed character. In some embodiments, the forces applied to the models at the time of impact can be simplified values measuring changes in linear momentum and angular momentum.

In some embodiments, the game engine calculates the change of momentum at the time of impact based on the physics associated with the character models involved in the collision. For the pushed character the change in momentum at the time of impact can be represented as the change in linear momentum and change in angular momentum. For the pushing character the change in momentum at the time of impact can be represented as the inverse of the change in linear momentum and the inverse of the change in angular momentum At block 508, the game engine 102 can determine the change in the center of mass of the pushed character. The transfer of force from the pushing character to the pushed character can move the center of mass of the pushed character. The physics engine determines the change in the center of mass based on the changes in momentum In some embodiments, the change in the center of mass can be based on the momentum associated with an, initial character model pose determined at block 502 and induced momentum.

At block 510, the game engine 102 can procedurally calculate a one or more features of the character model. In some embodiments, the feature(s) of the character model can be calculated based, at least in part, on the change in the center of mass determined at block 508 and on the initial position of the character determined at block 502. A feature of the character model can include one or more points, such as joints and/or rigid bodies, of the character model. The game engine can calculate rigid body approximations of the features and/or a target pose of the character model. The game engine 102 can procedurally calculate a target feature and/or a target pose that compensates for the change in the center of mass using inverse kinematics. For example, inverse kinematics can be used to predict a joint orientation for a kinematics chain in order for the character to be repositioned relative to the new location of the center of mass. The inverse kinematics process can be utilized to procedurally manipulate joints and rigid bodies of the character model to compensate for the change in the center of mass. Procedural solutions generated using inverse kinematics can be complex and in some circumstances can result in poses that may not look real or lifelike. Accordingly, as discussed below, motion capture data can be used to create more fluid and lifelike animations.

The game engine 102 can determine forces associated with the target feature and/or pose. The game engine can determine the forces being applied to the target feature(s) of the character model and the reactionary force of the character model against the applied forces. The target feature can include spatial coordinates for reference points of the target feature that can be used to identify the locations and magnitude of the forces associated with the target feature. The spatial coordinates may include additional information associated with the target feature including rotations, such as quaternion rotation values, for the different reference points of the target feature. Generally, although not necessarily, the reference points of the target feature may correspond to one or more joints of the movable character. In some cases, the joints may be associated with an individual point or pixel in a coordinate space. However, in other cases, the joints may be larger than an individual point or pixel and may encompass a number of points within the coordinate space. Further, in some cases, the joints may correspond to a polygon or other three-dimensional object.

Further, the game engine 102 may also calculate the target pose based, in part, on the collision event. For example, the target pose may be calculated based at least in part on one or more of the following: the collision event (for example, a punch, a kick, hitting a rock, falling off a cliff, and so forth); a velocity of the character when the collision event occurred; a velocity or force of a collision; characteristics of the environment (for example, the amount of gravity, whether the characters and water or on land, the current of the water, the type of land, and so forth); or other inputs associated with the game environment that may affect the physical forces associated with the movement of the character model. Moreover, the physics engine 112 may use one or more physics rules to help calculate the target pose.

At block 512, the character movement engine 110 identifies motion capture data within the motion capture data repository 132 based, at least in part on determined values for the forces associated with the target feature(s) and/or pose. The character movement engine 110 can identify motion capture data that has the correct counter or reactionary forces based on the determined force values and state of the character model.

In some embodiments, criteria for identifying the correct motion capture data include the induced linear momentum; and the state from the previous frame identifying the vector between a character feature (for example, the left foot and the center of mass), the vector between the a different character feature (for example, the right foot and the center of mass), and the moment of inertia of the body.

In some embodiments, block 514 may include identifying the motion capture data from a context-specific subset of motion capture data. For example, if the collision event is related to a tackle, the motion capture data may be selected from tackle-related motion capture data. On the other hand, if the collision event is related to a tackle in a soccer game, the motion capture data may be selected from soccer-related motion capture data.

At block 514, the physics engine 112 modifies the identified motion capture data received from the motion capture repository based on the target pose determined at block 510. Modifying the motion capture data can include updating trajectory and momentum of reference points to be substantially close to the forces associated with the determined target pose. In this manner, changes can be made to the motion capture data received from the motion capture repository to create poses that are more lifelike and realistic. The motion capture data received from the motion capture repository is not permanently modified or changed, rather the data is modified for the specific pose within the frame being rendered. In some embodiments, the positions of the feet and the center of mass can be modified. In such a case, the trajectory of the feet, center of mass, linear momentum, and angular momentum can also be calculated. In certain embodiments, block 510 may be considered an approximation of the pose based on the collision event.

In some embodiments, the physics engine 112 can update the feature(s) and/or pose of the character model by determining calculated values for joints of the character model. For example, the angular velocity of a joint can be calculated to reach a target linear and/or angular velocity; to reach a target linear and/or angular momentum around the center of mass; and/or to smooth the angular velocity relative to the identified motion capture data.

At block 518, the updated feature(s) and/or pose of the character model can be provided to the skinning and rendering engine 114 for rendering the character model within the game environment. The rendering engine 114 can render the character model for outputting the character model for display.

At the decision block 520, the game engine 102 determines whether an animation stop condition is satisfied. This animation stop condition can include any condition that indicates that the collision event animation has completed or is to cease. For example, the animation stop condition may be based on a separation of the character models, an event occurring within the game environment, or other stop condition. For instance, the animation may cease when the character models separate. As another example of a stop condition, the animation may cease after the occurrence of a game event, such as the end of quarter or halftime.

If it is determined at decision block 518 that the animation stop condition is satisfied, the process 500 may end. However, if it is determined at decision block 522 that the animation stop condition has not been satisfied, the process proceeds to block 520.

At block 520, the game engine 102 determines the updated forces on the character model for a subsequent frame based at least in part on the updated feature(s) and/or pose of the character model of block 518 from the current frame, which becomes the previous frame of the frame currently being processed. The process 500 may then return to block 510 where a new target pose for the character model is calculated based on the updated forces applied to the character model.

The process 500 can be implemented for each character involved in a collision event. Advantageously, in certain embodiments, using the process 500, the reactive animation process can dynamically adapt to collisions between characters that may occur within a game environment. In certain embodiments, the collision events dynamically transition from the occurrence of the initial collision to the characters actively responding to the received force from the opposing character. Thus, embodiments disclosed herein may provide a more realistic simulation in comparison to games that use canned animations. Furthermore, embodiments disclosed herein may use less storage space than applications that attempt to anticipate every in-game situation and provide a motion capture animation for each of the in-game situations. The embodiments disclosed herein can also be used in collision events involving more than two characters, the corresponding momentum and reactive forces are calculated of each of the characters.

Overview of Computing Device

Figure 6:
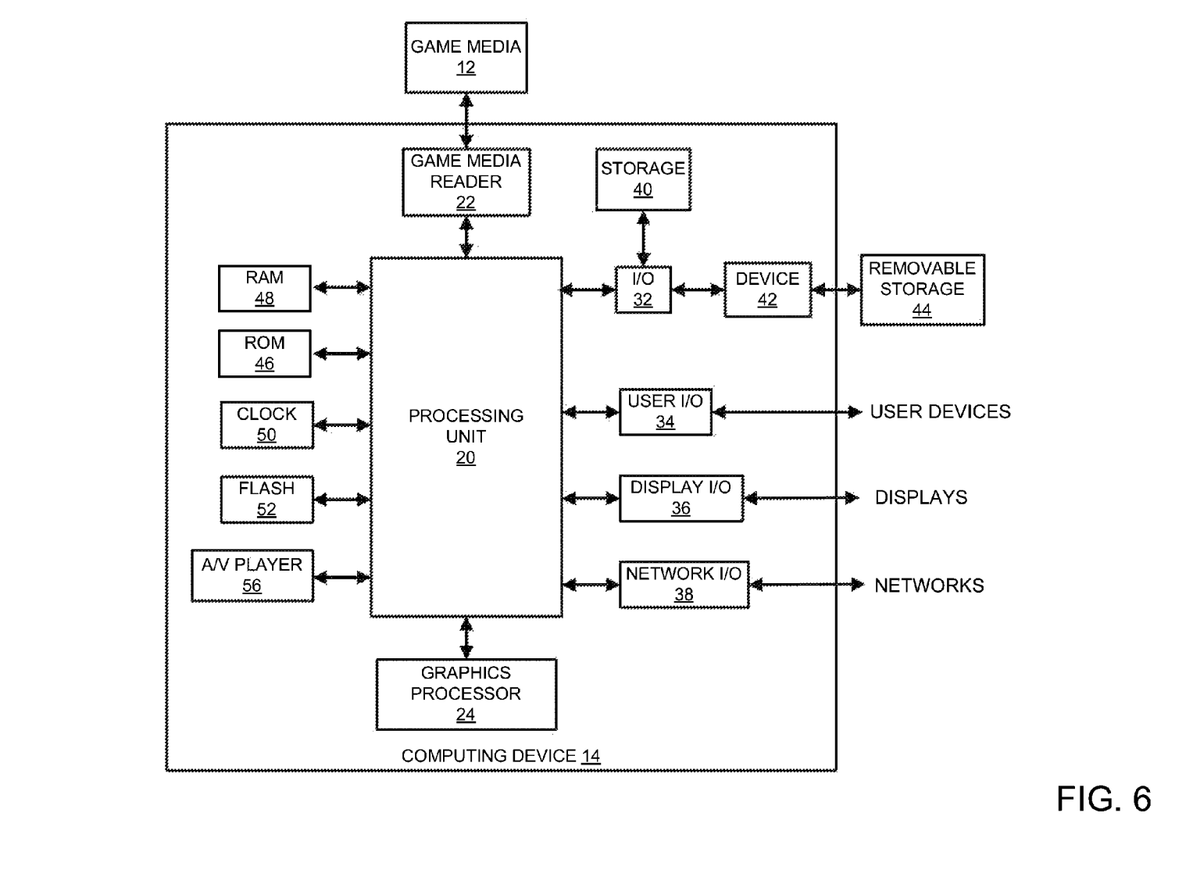
FIG. 6 illustrates an embodiment of a computing device.

FIG. 6 illustrates an embodiment of computing device 14 according to the present disclosure. Other variations of the computing device 14 may be substituted for the examples explicitly presented herein. The computing device 14 may include a game device, a smart phone, a tablet, a personal computer, a laptop, a smart television, a car console display, a server, and the like. As shown, the computing device 14 includes a processing unit 20 that interacts with other components of the computing device 14 and also external components to computing device 14. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 14 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 14 may include a discrete graphics processor 24 that is separate from the processing unit 20. In some such cases, the graphics processor 24 may have separate RAM from the processing unit 20. Computing device 14 might be a handheld video game device, a dedicated game console computing system, a general-purpose laptop or desktop computer, a smart phone, a tablet, a car console, or other suitable system.

Computing device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 14. Processing unit 20 can communicate through I/O 32 to store data, such as game state data and any shared data files. In addition to storage 40 and removable storage media 44, computing device 14 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 14 on a display device, such as graphics, user interfaces, video, and/or other visual content. Computing device 14 may comprise one or more integrated displays configured to receive display output signals produced by display I/O 36. According to some embodiments, display output signals produced by display I/O 36 may also be output to one or more display devices external to computing device 14, such a display 16.

The computing device 14 can also include other features that may be used with a game, such as a clock 50, flash memory 52, and other components. An audio/video player 56 might also be used to play a video sequence, such as a movie. It should be understood that other components may be provided in computing device 14 and that a person skilled in the art will appreciate other variations of computing device 14.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application, and portions thereof might also be reserved for frame buffers, application, state information, and/or other data needed or usable for interpreting user input and generating display outputs. Generally, RAM 48 is volatile storage and data stored within RAM 48 may be lost when the computing device 14 is turned off or loses power.

As computing device 14 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain, embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical, functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
a data store comprising game application data;
a motion capture data store comprising motion capture data; and
a computing device in electronic communication with the data store and configured to execute a game application, based in part on the game application data, the game application configured to:
generate a virtual game environment;
determine a first pose of a first virtual character model within the virtual game environment, the first virtual character model comprising a plurality of rigid bodies connected by a plurality of joints, wherein the first pose is a first arrangement of the rigid bodies and joints of the first virtual character model;
detect a collision event of the first virtual character model with a virtual entity within the virtual game environment;
calculate at least one target feature of the first virtual character model based, at least in part, on the collision event;
identify motion capture data in the motion capture data store based, at least in part, on the collision event and the at least one target feature of the first virtual character model, wherein the motion capture data corresponds to a second arrangement of the first virtual character model;
modify the motion capture data received from the motion capture data store based, at least in part, on the at least one target feature to generate an updated pose of the first virtual character model, wherein the updated pose is a third arrangement of the first virtual character model;
render the first virtual character model based, at least in part on the updated pose of the first virtual character model; and
generate instructions to output a frame comprising at least a portion of the updated pose of the first virtual character model rendered by a rendering engine of the game application for a user display.

2. The system of claim 1, wherein the at least one target feature is a change of center of mass of the first virtual character model based, at least in part, on the collision event.

3. The system of claim 1, wherein calculate the at least one target feature includes determine forces associated with one or more preference points of the first virtual character model based, at least in part, on the collision event.

4. The system of claim 3, wherein the forces associated with one or more reference points comprise at least one of linear momentum or angular momentum.

5. The system of claim 1, wherein the virtual entity is a second virtual character model.

6. The system of claim 1, wherein the collision event comprises an external force applied by the virtual entity.

7. The system of claim 1, wherein the motion capture data is pre-captured animation data.

8. The system of claim 1, wherein the game application is further configured to:
determine whether the collision event has ended; and
based on a determination that the collision event has not ended, determine at least one updated target feature based, at least in part on internal forces associated with the first virtual character model and external forces associated with the virtual entity.

9. The system of claim 1, wherein the at least one target feature is calculated based, at least in part, on an inverse kinematic analysis.

10. The system of claim 1, wherein the collision event comprises a second virtual entity.

11. A computer-implemented method comprising:
as implemented by a user computing device configured with specific computer-executable instructions for executing a game application,
generating a virtual environment;
determining a first pose of a first virtual character model within the virtual environment, the first virtual character model comprising a plurality of a rigid bodies connected by a plurality of joints; wherein the first pose is a first arrangement of the rigid bodies and joints of the first virtual character model;
detecting a collision event of the first virtual character model with a virtual entity within the virtual environment;
calculating at least one target feature of the first virtual character model based, at least in part, on the collision event;
identifying motion capture data in a motion capture data store based at least in part on the collision event and the at least one target feature of the first virtual character model, wherein the motion capture data corresponds to a second arrangement of the first virtual character model;
modifying the motion capture data received from the motion capture data store based, at least in part, on the at least one target feature to generate an updated pose of the first virtual character model, wherein the updated pose is a third arrangement of the first virtual character model;
rendering the first virtual character model based, at least in part on the updated pose of the first virtual character model; and
generating instructions to output a frame comprising at least a portion of the updated pose of the first virtual character model rendered by a rendering engine of the game application for a user display.

12. The method of claim 11, wherein calculating the at least one target feature of the first virtual character model further comprises calculating a change of center of mass of the first virtual character model based, at, least in part, on the collision event.

13. The method of claim 11, wherein calculating the at least one target feature of the first virtual character model further comprises determining forces associated with one or more reference points of the first virtual character model based, at least in part, on the collision event.

14. The method of claim 11, wherein the virtual entity is a second virtual character model.

15. The method of claim 11, wherein the collision event comprises an external force applied by the virtual entity.

16. A non-transitory computer-readable storage medium having stored thereon instructions that, when executed, direct a computing system to perform a method for rendering frames within a game application, the method comprising:

generating a virtual environment;

determining a first pose of a first virtual character model within the virtual environment, the first virtual character model comprising a plurality of a rigid bodies connected by a plurality of joints; wherein the first pose is a first arrangement of the rigid bodies and joints of the first virtual character model;

detecting a collision event of the first virtual character model with a virtual entity within the virtual environment;

calculating at least one target feature of the first virtual character model based at least in part on the collision event;

identifying motion capture data in a motion capture data store based at least in part on the collision event and the at least one target feature of the first virtual character model, wherein the motion capture data corresponds to a second arrangement of the first virtual character model;

modifying the motion capture data received from the motion capture data store based, at least in part, on the at least one target feature to generate an updated pose of the first virtual character model, wherein the updated pose is a third arrangement of the first virtual character model;

rendering the first virtual character model based, at least in part on the updated pose of the first virtual character model; and generate instructions to output a rendering of the updated pose of the first virtual character model.

17. The non-transitory computer readable medium of claim 16, wherein calculating the at least one target feature of the first virtual character model further comprises calculating a change of center of mass of the first character model based, at least in part, on the collision event.

18. The non-transitory computer readable medium of claim 16, wherein calculating the at least one target feature of the first virtual character model further comprises determining forces associated with one or more reference points of the first virtual character model based, at least in part, on the collision event.

19. The non-transitory computer readable medium of claim 16, wherein the virtual entity is a second virtual character model.

20. The non-transitory computer readable medium of claim 16, wherein the collision event comprises an external force applied by the virtual entity.

* * * * *